SUPERVISORY CIRCUIT FOR TELEPHONE SUBSCRIBER'S LINE

Filed March 25, 1964

INVENTOR
L. L. MAUL
BY Roy M. Porter Jr.
ATTORNEY

United States Patent Office 3,321,583

Patented May 23, 1967

3,321,583

SUPERVISORY CIRCUIT FOR TELEPHONE SUBSCRIBER'S LINE

Lloyd L. Maul, Lincroft, N.J., assignor to Bell Telephone Laboratories, Incorporated, New York, N.Y., a corporation of New York Filed Mar. 25, 1964, Ser. No. 354,580
5 Claims. (Cl. 179—18)

This invention pertains to supervisory circuits and more specifically to supervisory circuits utilized to determine the condition of subscriber subset loops in a telephone switching system.

With the installation of the telephone service in sparsely populated rural areas it has been found advantageous to utilize remote line concentrator circuits to reduce the number of trunks connecting these outlying subscribers to a central orifice. By employing such concentrator systems a smaller number of trunk circuits than subscriber lines can be extended between the distant central office and the concentrator thereby appreciably reducing the cost of providing service. In such a system the subscribers are not directly connected to a central office and switching equipment must be provided to make some of these connections.

In most telephone systems, subscriber subset loops display unique direct-current conditions for the "on hook" and "off hook" states. Since the direct-current condition of the subscriber loop as reflected by a change in subset impedance is indicative of the on hook or off hook state of the subset, knowledge of this condition may be utilized to determine the switching requirements of the subsets connected to such a remote concentrator. In order to provide efficient service, equipment within the concentrator must be able to recognize a subscriber request for service or a subscriber response to a call and to transfer the monitored information to the switching control circuitry which resides in the central office.

As the distances between rural areas and centrally located central offices increase, there is a greater desire for increased sensitivity in monitoring equipment while at the same time a desire to reduce the costs needed for such equipment. These conditions have led to the development of solid-state nonelectromechanical supervisory circuits. Various arrangements using transistor circuitry to provide off-hook supervision exist in the prior art. However, a recurrent problem existing in these arrangements is the possibility of false signaling occurring in circuits providing off-hook supervision in the presence of ringing current. Conventionally, ringing current voltages are much larger than quiescent battery voltages existing on the line and as a consequence thereof it has bene difficult to provide adequate protection for the highly sensitive solid-state supervisory circuit arrangements. Various techniques are employed to desensitize the solid-state detecting arragement so as to minimize this danger.

Accordingly, it is an object of this invention to provide an improved supervisory circuit for determining the direct-current condition of a subscriber subset loop in an alternating-current coupled, remote line concentrator.

It is yet another object of this invention to provide an improved off-hook detecting arrangement which is reliably operable in the presence of ringing signals.

These and other objects are achieved in accordance with the principles of the invention by employing a station supervisory circuit arrangement using a loop current detecting transistor switch which controls the charging time of a capacitor that has equal but independent charging and discharging resistance paths and therefore equal charging rates. Station pickup may be detected even during the interval that ringing is applied to the station set.

One embodiment of my invention utilizes a transistor switch which is activated by the flow of loop current upon the coming off-hook by a subscriber. A detector arrangement comprising a capacitor having independent charging and discharging paths is made responsive to the turning on of the transistor switch. A threshold device such as a zener diode is connected between the capacitor and the output so that when the capacitor stored voltage has reached a predetermined value, i.e., the threshold value, an output signal is transmitted. By providing equal resistances in the charging and discharging circuit paths for the capacitor, equal charging and discharging rates limit the capacitor voltage to a value below the threshold value during the incidence of ringing current while the station is on-hook. By coming off-hook an unbalance is introduced in favor of charging time so that the threshold voltage is reached shortly thereafter. The circuit is designed so that ringing signals are applied to the subset through the transistor switch, allowing the ringing signal to operate the switch during a portion of the ringing cycle. By signaling in this manner the problem of shielding the switch during the high voltage ringing is eliminated and off-hook supervision of a subscriber loop can be accomlpished in the presence of ringing signals in a reliable manner.

Accordingly, one feature of my invention relates to the use of a sensitive detector arrangement employing a transistor as a switching element for loop supervision in a telephone switching network.

Another feature of my invention is the provision of means for applying ringing signals through a loop current monitoring switching transistor.

Yet another feature of my invention is the use of equal charging and discharging paths for controlling the stored voltage in a capacitor detector to thereby prevent false loop signals from being transmitted during the presence of ringing.

An additional feature of my invention relates to the utilization of a threshold device for transmitting to an output terminal an off-hook condition.

These and other objects and features of my invention will be better understood upon an examination of the following detailed description and the accompanying drawing in which.

NONBALANCED SUPERVISORY CIRCUIT ARRANGEMENT

Figure 1:
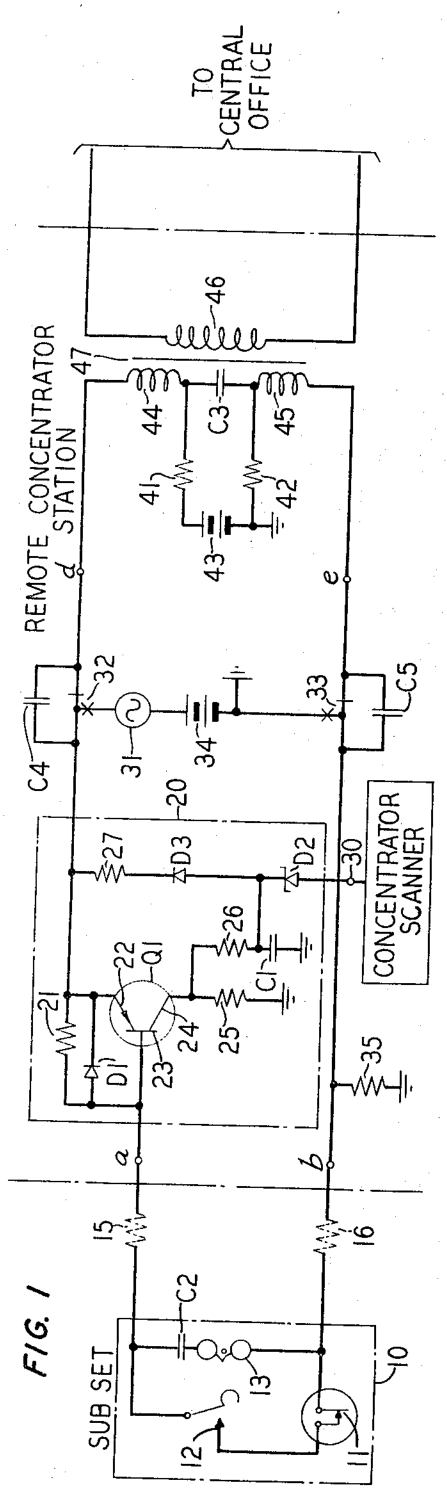
FIG. 1 is a schematic representation of an alternating-current coupled, subscriber subset loop including a supervisory circuit used to measure direct-current conditions occurring therein in accordance with one specific embodiment of my invention.

Referring now to FIG. 1, subset 10 during the interval that the subscriber is on-hook maintains switchhook contacts 12 in an open condition and has bridged across the line the series arrangement of bell 13 and capacitor C2. Resistors 15 and 16 shown dotted, represent the loop impedance associated with the length of conductors between the subset and the equipment in question located at a remote concentrator station.

A. *Direct-current loop supervision*

During the off-hook state a completed direct-current path exits to the left of points *a* and *b* through closed switchhook contacts 12 and dial contacts 11. Therefore, when the station comes off-hook, transistor Q1 is forward biased and turned on via a path which includes battery 43, resistor 41, transformer coil inductance 44, transfer contact 32, resistor 21, resistor 15, subset switchhook contacts 12, dial contacts 11, resistor 16, transfer contact 33, transformer coil inductance 45 and resistance 42 to ground. Since the voltage across biasing resistor 21 causes emitter 22 to be positive with respect to base 23 the transistor is turned on and current from battery 43 flows over part of the same path described previously through emitter 22 to collector 24 through resistor 26 to capacitor C1 and ground, thereby causing capacitor C1 to charge towards the voltage of battery 43. Diode D2 is a zener diode with a threshold breakdown voltage which is reached before capacitor C1 charges to its full potential. When the threshold voltage is reached and the diode D2 breaks down, an output voltage is transmitted to output terminals 30 which might be a scan point on a concentrator.

B. *Off-hook supervision in the presence of ringing signals*

When the subscriber at subset 10 is being called, common control equipment energizes a relay having transfer contacts 32 and 33 thereon. This causes A.C. ringing voltage from generator 31 which is superimposed upon battery 34 to be applied across the line. During a positive cycle of the ringing generator signal while the subscriber at subset 10 is on hook, D.C. current is blocked and only A.C. current flows to the left of points *a* and *b* into the subset since contact 12 is opened and the only complete path through the subset is through capacitor C2 and ringer 13. Consequently, on the positive cycle of the ringing generator signal, transistor Q1 is forward biased over a path which includes sources 31 and 34, transfer contact 32, resistor 21, resistor 15, capacitor C2, ringer 13, resistor 16, transfer contact 33 to ground. Precisely as before capacitor C1 begins to charge to the peak value of the voltage of signal generator 31 through the emitter-collector junction of transistor Q1. Resistor 26 and capacitor C1 are chosen such that the threshold value of D2 is not reached before the A.C. signal from generator 31 begins its negative excursion. For example, if the product of the resistance and capacitance values is about ten times the period of a half cycle of ringing current and the threshold value of diode D2 is approximately one quarter of the voltage of generator 31 reliable supervision is obtained.

During negative excursions of the signal generator voltage, transistor Q1 is turned off since now current flows in the same circuit described above in the reverse direction through diode D1 instead of resistor 21. As a consequence of this the base emitter junction of transistor Q1 is back biased and transistor Q1 is turned off. The charging of capacitor C1 ceases and the accumulated charge on capacitor C1 begins to leak off over a path from capacitor C1 through diode D3, resistor 27, transfer contact 32, sources 31 and 34 to ground. By selecting the value of resistor 27 to be equal to the value of resistor 26, capacitor C1 alternately charges and discharges for equal time intervals during the positive and negative voltage excursions respectively, of the signal generator 31. As a result of this circuit arrangement, the voltage across capacitor C1 never reaches the threshold value required to break down diode D2.

If now the subscriber comes off hook, a completed D.C. path is provided to the left of points *a* and *b* by the closing of the switchhook contacts. As a result of this, current now flows in the subscriber loop which includes both A.C. and D.C. components from sources 31 and 34 causing transistor Q1 is to be biased on for a longer time than it is biased off and capacitor C1 will be able to reach the threshold value after at most a few complete cycles of the signal from source 31. When the stored capacitor voltage reaches the threshold value as a result of the greater charging time (at the expense of discharging time) diode D2 breaks down as before to transmit an output signal to terminal 30.

The sensitivity of this circuit can be adjusted to the desired value by judiciously choosing the value of biasing resistor 21. Also by including resistor 35 as shown, better line impedance balance is attained of the supervisory circuit. The subscriber loop is A.C. coupled to the central office by means of transformer 47 and speech transmission takes place through the low alternating-current impedance base-emitter junction of transistor Q1 without any substantial impediment introduced by the supervisory circuit arrangement. Resistor 25 prevents the buildup of voltage on capacitor C1 due to transistor leakage current and resistors 41 and 42 represent heat coils connected in a standard fashion to give overload protection. The dial pulse output can be obtained from across resistor 25 to avoid the distortion introduced by the rounded knee characteristic of diode D2. It should also be noted that capacitors C4 and C5 provide a low impedance to voice frequencies but allow for the transmission of ringback signals.

BALANCED ARRANGEMENT FOR LOOP SUPERVISION

Figure 2:
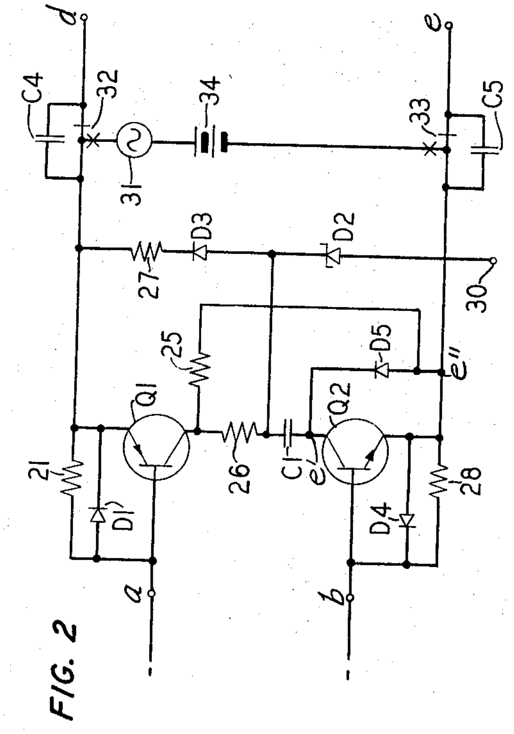
FIG. 2 shows a balanced arrangement using complementary transistors and a single detector for performing the same functions.

The circuit of FIG. 2 may be used to replace the circuitry shown between the four terminals *a, b, d* and *e*. This arrangement operates in a similar manner to the arrangement described in FIG. 1 with the exception that complementary transistors Q1 and Q2 are used to achieve balanced operation in an ungrounded circuit. A single detecting arrangement can be used as before to cause an output to be transmitted through diode D2 to output terminal 30 on a concentrator scanner.

Figure 3:
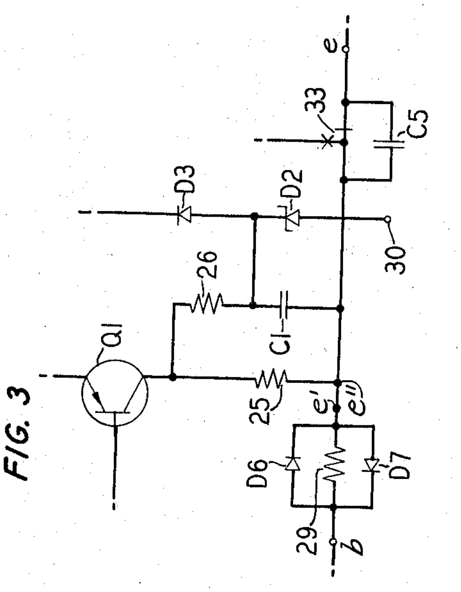
FIG. 3 is a detail of a modification of the circuit shown in FIG. 2.

During positive excursions of signal generator 31, or due to the application of positive battery potential during an off-hook condition, both transistors Q1 and Q2 are forward biased over a path from terminal *d* (which is assumed positive with respect to *e*) through resistor 21, through the subset connected between terminals *a* and *b*, through resistor 28 to terminal *e* to allow capacitor C1 to charge as before. During a negative ringing cycle if the subscriber is on-hook, transistors Q1 and Q2 are biased off by current flow through diodes D4 and D1 and capacitor C1 is permitted to discharge through resistor 27 by virtue of diode D5. As before, if resistor 26 is selected to be substantially equal to resistor 27, the threshold voltage on capacitor C1 will not be reached during on-hook conditions since equal charging and discharging times take place. It is to be noted that FIG. 2 may be modified so that in lieu of using transistor Q2, diodes D4 and D5, and resistor 28 as shown, a balanced arrangement may be obtained as shown in the detail diagram of FIG. 3 by connecting the three-element parallel combination of two oppositely poled diodes D6 and D7 and a resistance 29 in series between terminals *b* and *e'* and joining points *e'* and *e''*. Since in both of the supervisory arrangements described in FIGS. 1 and 2 ringing current is deliberately applied through the transistor switch, the normal hazard existing when the high voltage ringing signal is applied to the subset is absent. Rather than trying to desensitize the supervisory circuit from the ringing signals to prevent the detecting circuitry from falsely operating, the arrangement utilizes the ringing signal to judiciously operate the transistor switch.

It is to be understood that the above-described arrangements are illustrative of the application of the principles of the invention. Numerous other arrangements may be devised by those skilled in the art without departing from the spirit and scope of the invention.

What is claimed is:

1. A supervisory circuit for a telephone system comprising a subset loop having an on-hook open D.C. circuit and an off-hook closed D.C. circuit state; means for connecting alternating-current ringing signals to said loop; means for detecting said off-hook state during the presence or absence of said ringing signals in said loop including energy storage means, energizing means and output gating means responsive to said storage means for indicating said off-hook state; and means for preventing a false indication of said off-hook state during the presence of said ringing signals including de-energizing means responsive during alternate portions of said ringing signals for de-energizing said storage means.

2. A supervisory circuit for a telephone system comprising a subset loop having an on-hook open D.C. circuit and an off-hook closed D.C. circuit state; means for connecting alternating-current ringing signals to said loop; means for detecting said off-hook state during the presence or absence of said ringing signals in said loop including voltage storage means, energizing means having a specified impedance and voltage breakdown means responsive to said storage means for indicating said off-hook state; and means for preventing the false indication of said off-hook state during the presence of said ringing signals including de-energizing means having an impedance substantially identical to said impedance of said energizing means for de-energizing said storage means during alternate portions of said ringing signals.

3. A supervisory circuit for a telephone system in accordance with claim 2 wherein said voltage storage means includes capacitor means, said voltage breakdown means includes zener diode means and said energizing and de-energizing means include independent resistance path means.

4. A supervisory circuit for a telephone system comprising a subset loop having an on-hook open D.C. circuit and an off-hook closed D.C. circuit state; source means including alternating-current ringing generator means for signaling said subset loop; and means for detecting said off-hook state during the presence or absence of signals from said ringing means in said loop including transistor switch means responsive to said off-hook state and to positive cycles of said alternating-current ringing generator, capacitor means, output gating means for indicating an off-hook state including a zener diode having a predetermined breakdown voltage value, means including a first resistor for charging said capacitor means responsive to said switch for actuating said zener diode, and means for discharging said capacitor means including a second resistance substantially equal to said first resistance and responsive during said on-hook state for limiting said charging of said capacitor means to a potential below said breakdown value during the negative cycle of said ringing generator means.

5. A supervisory circuit for a telephone system in accordance with claim 4 wherein said loop includes a subscriber subset and a balanced network, and wherein said transistor switch means includes a base electrode connected to said network, an emitter electrode connected to said source means and a collector electrode connected to said detecting means.

References Cited by the Examiner

UNITED STATES PATENTS

| | | | |
|---|---|---|---|
| 3,102,168 | 8/1963 | Cirone et al. | 179—18 |
| 3,156,778 | 10/1964 | Cirone | 179—18 |
| 3,159,714 | 12/1964 | Abbott et al. | 179—18 |

References Cited by the Applicant

UNITED STATES PATENTS

| | | |
|---|---|---|
| 2,921,140 | 1/1960 | Abbott. |
| 2,977,420 | 3/1961 | Lowry. |

KATHLEEN H. CLAFFY, *Primary Examiner.*

WILLIAM C. COOPER, *Examiner.*